United States Patent
Kikkawa

(10) Patent No.: US 11,986,086 B2
(45) Date of Patent: May 21, 2024

(54) INTERDENTAL CLEANING TOOL

(71) Applicant: KOBAYASHI PHARMACEUTICAL CO., LTD., Osaka (JP)

(72) Inventor: Tasuku Kikkawa, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 848 days.

(21) Appl. No.: 17/050,539

(22) PCT Filed: Apr. 26, 2019

(86) PCT No.: PCT/JP2019/017968
§ 371 (c)(1),
(2) Date: Mar. 26, 2021

(87) PCT Pub. No.: WO2019/208782
PCT Pub. Date: Oct. 31, 2019

(65) Prior Publication Data
US 2023/0148742 A1 May 18, 2023

(30) Foreign Application Priority Data
Apr. 27, 2018 (JP) .................. 2018-087036

(51) Int. Cl.
*A46D 1/00* (2006.01)
*A46B 9/02* (2006.01)
*A46B 9/04* (2006.01)

(52) U.S. Cl.
CPC ................ *A46B 9/026* (2013.01); *A46B 9/04* (2013.01); *A46D 1/00* (2013.01); *A46D 1/02* (2013.01); *A46B 2200/108* (2013.01)

(58) Field of Classification Search
CPC ..... A46B 9/026; A46B 9/04; A46B 2200/108; A46D 1/00; A46D 1/02
See application file for complete search history.

(56) References Cited

U.S. PATENT DOCUMENTS

| | | |
|---|---|---|
| 2010/0015567 A1 | 1/2010 | Elbaz |
| 2015/0114428 A1 | 4/2015 | Kato |

(Continued)

FOREIGN PATENT DOCUMENTS

| | | |
|---|---|---|
| CH | 711 465 B1 * | 2/2017 |
| EP | 0680707 A2 | 11/1995 |

(Continued)

OTHER PUBLICATIONS

International Search Report for International Application No. PCT/JP2019/017968 dated Jul. 23, 2019 (2 sheets, 2 sheets translation, 4 sheets total).

(Continued)

*Primary Examiner* — Randall E Chin
(74) *Attorney, Agent, or Firm* — Kratz, Quintos & Hanson, LLP

(57) ABSTRACT

An interdental cleaning tool includes a base portion including a shaft portion having a shape insertable in an interdental space, a top end side cleaning portion including a top end side body covering a top end side portion of the shaft portion, and a plurality of top end side bristles protruding outward from an outer circumferential surface of the top end side body, and a base end side cleaning portion including a base end side body covering a portion of the shaft portion further in a base end side than the top end side body, and a plurality of base end side bristles protruding outward from an outer circumferential surface of the base end side body. The top end side cleaning portion has a lower hardness than the base end side cleaning portion.

4 Claims, 1 Drawing Sheet

(56) References Cited

U.S. PATENT DOCUMENTS

| | | |
|---|---|---|
| 2016/0058531 A1 | 3/2016 | Adriano |
| 2017/0189148 A1 | 7/2017 | Kato |
| 2018/0250104 A1 | 8/2018 | Adriano |
| 2018/0256298 A1 | 9/2018 | Kikkawa |

FOREIGN PATENT DOCUMENTS

| | | | |
|---|---|---|---|
| EP | 3245977 A1 | | 11/2017 |
| JP | H08-266336 A | | 10/1996 |
| JP | H09-023928 A | | 1/1997 |
| JP | H10-117846 A | | 5/1998 |
| JP | 2016-521159 A | * | 7/2016 |
| WO | 2013/176297 A1 | | 11/2013 |
| WO | 2014/023424 A1 | | 2/2014 |
| WO | 2017/038654 A1 | | 3/2017 |
| WO | 2017/122783 A1 | | 7/2017 |

OTHER PUBLICATIONS

Extended European Search Report for European Patent Application No. 19791771.9 dated May 21, 2021 (8 sheets).
Communication pursuant to Article 94(3) EPC for European Patent Application No. 19791771.9 dated Sep. 29, 2022 (6 sheets).

* cited by examiner

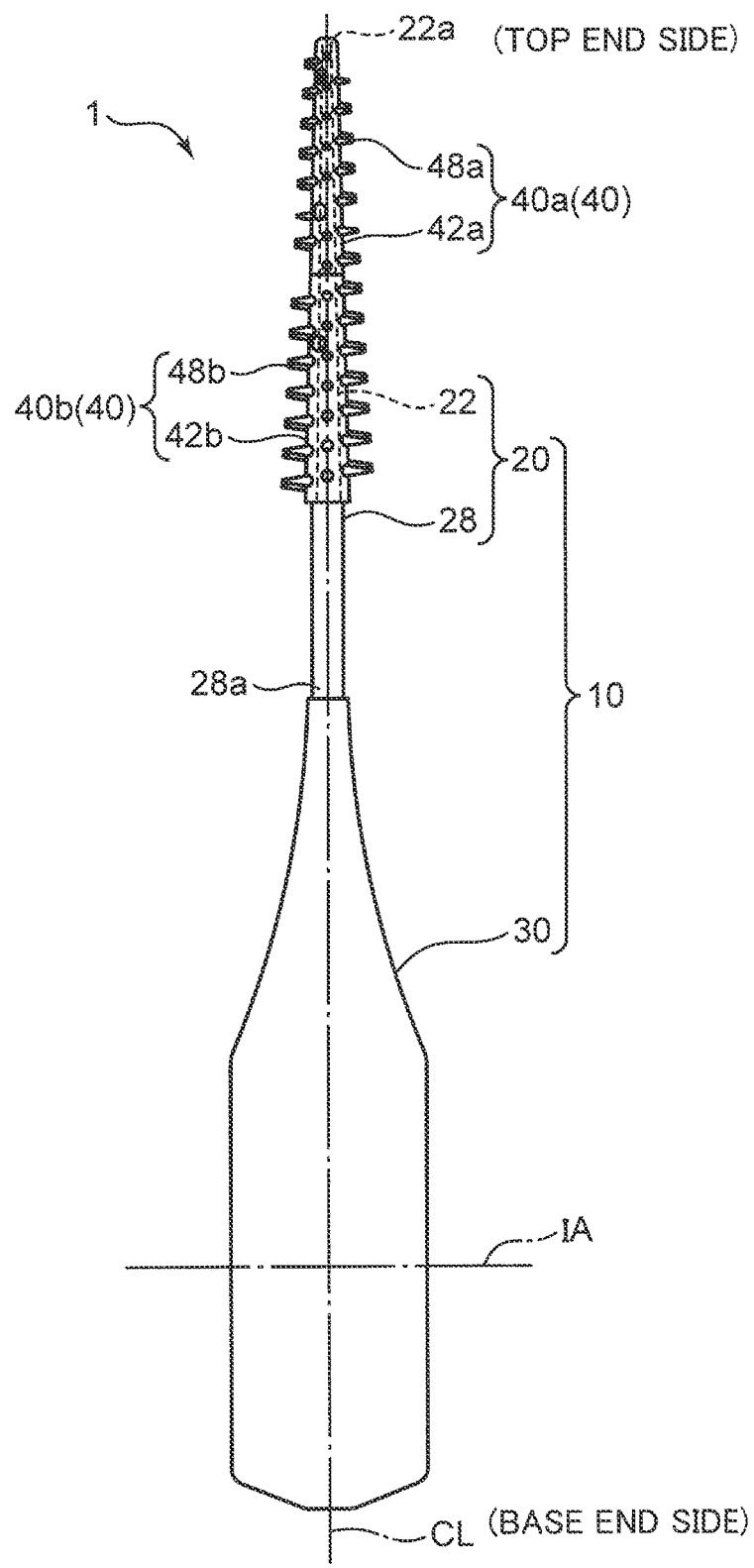

INTERDENTAL CLEANING TOOL

TECHNICAL FIELD

The present invention relates to an interdental cleaning tool.

BACKGROUND ART

Conventionally, an interdental cleaning tool for cleaning an interdental space is known. For example, Patent Literature 1 discloses an interdental cleaning tool including a base structure portion made of synthetic resin, and a soft portion made of elastomer. The base structure portion includes a core base structure portion insertable in an interdental space, and a handling base structure portion having a shape that can be held by fingers. The soft portion includes a covering portion that covers a portion of an outer circumferential surface of the core base structure portion, and a plurality of protruding portions each protruding outward from the outer circumferential surface of the covering portion.

CITATION LIST

Patent Literature

Patent Literature 1: WO 2013/176297 A

SUMMARY OF INVENTION

Problems to be Solved by the Invention

To enable a user to easily insert an interdental cleaning tool and to provide the interdental cleaning tool with a high cleaning capability will involve contradicting requirements for the thickness of a core frame portion. Specifically, the easy insertion prefers a thin core frame portion. On the other hand, in order to provide the interdental cleaning tool with a high cleaning capability, it is preferable that the interdental cleaning tool is formed with a thicker core frame portion to cause a soft portion covering the core frame portion to come into tight contact with oral tissues (that is, teeth and gum). Thus, it is difficult to obtain both the easy insertion and the high cleaning capability by the way of the conventional technique.

An object of the present invention is to provide an interdental cleaning tool configured to be easily inserted in an interdental space by a user, and to show a high capability of cleaning an interdental space.

Solution to Problem

An interdental cleaning tool according to an aspect of the present invention includes a base portion including a shaft portion having a shape insertable in an interdental space, a top end side cleaning portion including a top end side body covering a top end side portion of the shaft portion, and a plurality of top end side bristles protruding outward from an outer circumferential surface of the top end side body, and a base end side cleaning portion including a base end side body covering a portion of the shaft portion further in a base end side than the top end side body, and a plurality of base end side bristles protruding outward from an outer circumferential surface of the base end side body. The top end side cleaning portion has a lower hardness than the base end side cleaning portion.

In the configuration, since the top end side cleaning portion has a lower hardness than the base end side cleaning portion, the top end side bristle of the top end side cleaning portion is easily bent when the top end side cleaning portion is inserted in the interdental space, and does not cause an excessively large resistive force against insertion of the top end side cleaning portion in the interdental space. Thus, a user can easily insert the top end side cleaning portion in the interdental space. Meanwhile, since the base end side cleaning portion has a higher hardness than the top end side cleaning portion, the base end side bristle of the base end side cleaning portion abuts strongly against the oral tissues forming the interdental space (that is, the teeth and the gum), and can effectively remove the deposit from the oral tissues.

In the configuration, the top end side cleaning portion may have a hue different from a hue of the base end side cleaning portion.

In the configuration, since the top end side cleaning portion and the base end side cleaning portion have different hues, the user can visually recognize the difference in physical properties between the top end side cleaning portion and the base end side cleaning portion. In addition, provided with a colorful outer surface with a plurality of hues, the interdental cleaning tool is given an excellent appearance.

In the configuration, the base end side cleaning portion may be made of a composite material containing elastomer and a reinforcing material.

Since the base end side cleaning portion according to the configuration is made of a composite material containing elastomer and a reinforcing material, the base end side bristle of the base end side cleaning portion has a higher rigidity than a conventional cleaning portion made only of elastomer, and thus the interdental space can effectively be cleaned.

Advantageous Effects of Invention

An interdental cleaning tool allows easy insertion in an interdental space by a user and has a high capability of cleaning an interdental space.

BRIEF DESCRIPTION OF DRAWINGS

FIG. 1 is a schematic front view of an illustrative interdental cleaning tool.

DESCRIPTION OF EMBODIMENT

FIG. 1 is a schematic front view of an illustrative interdental cleaning tool 1. With reference to FIG. 1, the interdental cleaning tool 1 will be described.

In FIG. 1, a term "base end side" and a term "top end side" are given. The term "base end side" indicates a side close to fingers of a user when the interdental cleaning tool 1 is held by the user. The term "top end side" indicates the opposite side of the base end side. A structure of the interdental cleaning tool 1 will be described using these terms as reference. The terms given in FIG. 1 are used only for clarifying the description and not by means of limiting the interpretation.

The interdental cleaning tool 1 includes a base portion 10 of which base end side can be held by the fingers of the user and top end side is insertable in an interdental space by the user, and a cleaning portion 40 that covers the top end portion of the base portion 10. The base portion 10 provides the interdental cleaning tool 1 with a suitable hardness to prevent the interdental cleaning tool 1 from unnecessarily bending when inserted in the interdental space. The cleaning portion 40 covering the top end portion of the base portion 10 is made of a material having a lower hardness than the base portion 10, and prevents the hard base portion 10 from directly making contact with the oral tissues (that is, the teeth and the gum). The cleaning portion 40 is formed to directly contact the oral tissues and scrape out the deposit from the oral tissues. The top end portion of the base portion 10 covered by the cleaning portion 40 and having a suitable hardness as described above serves as a core material that prevents the cleaning portion 40 from unnecessarily bending when the interdental cleaning tool 1 is inserted in the interdental space.

The base portion 10 is made of a synthetic resin such as polypropylene, polyethylene, ABS, polybutylene terephthalate, polycarbonate, polyethylene terephthalate, polystyrene, and polyacetal. In the embodiment, the base portion 10 is made of polypropylene.

To describe the shape of the base portion 10, a central axis CL extending from the base end side to the top end side (or in the opposite direction) and a perpendicular axis IA that is perpendicular to the central axis CL are illustrated in FIG. 1. Hereinafter in the description, the extending direction of the central axis CL is referred to as "axial direction".

The base portion 10 includes a grip portion 30 disposed in the base end side, and a shaft portion 20 having a bar shape extending from the grip portion 30 to the top end side along the central axis CL. The grip portion 30 has a form of a thin plate having a large dimension in the extending direction of the perpendicular axis IA, and a small dimension in a virtual axis (not shown) perpendicular to both the perpendicular axis IA and the central axis CL to be held by the fingers of the user. The shaft portion 20 extending from the grip portion 30 to the top end side along the central axis CL has a form of a bar having a thickness insertable in the interdental space. The shaft portion 20 is longer than the grip portion 30 in the axial direction. An end portion at which the shaft portion 20 is connected to the grip portion 30 is hereinafter referred to as "base end portion 28a". An end portion of the shaft portion 20 opposite to the base end portion 28a is hereinafter referred to as "insertion end portion 22a". The shaft portion 20 gradually becomes thinner from the base end portion 28a to the insertion end portion 22a.

A predetermined section of the shaft portion 20 from the insertion end portion 22a to the base end side is covered by the cleaning portion 40. The section covered by the cleaning portion 40 is hereinafter referred to as "covered section 22". The section of the shaft portion 20 other than the "covered section 22" is an exposed section 28 which is not covered by the cleaning portion 40. In the embodiment, the covered section 22 has approximately the same length in the axial direction as the exposed section 28.

The cleaning portion 40 covering the covered section 22 of the shaft portion 20 is formed of a top end side cleaning portion 40a covering the predetermined section of the shaft portion 20 from the insertion end portion 22a to the base end side, and a base end side cleaning portion 40b covering the outer circumferential surface of the shaft portion 20 further in the base end side than the top end side cleaning portion 40a. A length ratio of the top end side cleaning portion 40a to the base end side cleaning portion 40b is preferably from 1:0.2 to 1.3. When the top end side cleaning portion 40a is longer than the base end side cleaning portion 40b, the interdental cleaning tool 1 can move back and forth by a longer length through the interdental space without receiving a large resistive force. Meanwhile, when the base end side cleaning portion 40b is longer than the top end side cleaning portion 40a, a length used for effectively removing the deposit from the interdental space becomes longer. In the embodiment, the top end side cleaning portion 40a and the base end side cleaning portion 40b each constitute approximately a half of the covered section 22 in the axial direction.

Each of the top end side cleaning portion 40a and the base end side cleaning portion 40b may be molded with an elastomer material such as styrene elastomer, silicone, olefinic elastomer, and polyester elastomer or a composite material of an elastomer material containing a small amount of a reinforcing material such as glass fibers and talc. The composite material preferably contains the reinforcing material by 3% by weight to 50% by weight, inclusive, more preferably 5% by weight to 35% by weight, inclusive. However, the top end side cleaning portion 40a and the base end side cleaning portion 40b are molded with different molding materials different in hardness (that is, elastomer material or a composite material).

The top end side cleaning portion 40a is molded with a molding material having a lower hardness than the base end side cleaning portion 40b. A hardness ratio of the molding materials molded into the top end side cleaning portion 40a and the base end side cleaning portion 40b (=(hardness of top end side cleaning portion 40a)/(hardness of base end side cleaning portion 40b)) is preferably from 0.9 to 0.3, more preferably from 0.8 to 0.5, and particularly preferably from 0.7 to 0.6. The top end side cleaning portion 40a is preferably molded with a molding material having a Shore hardness of A1 to A50, more preferably a molding material having a Shore hardness of A10 to A45, and particularly preferably a molding material having a Shore hardness of A15 to A40. The base end side cleaning portion 40b is preferably molded with a molding material having a Shore hardness of A2 to A90, more preferably a molding material having a Shore hardness of A15 to A85, and particularly preferably a molding material having a Shore hardness of A20 to A80. The Shore hardness of each of the top end side cleaning portion 40a and the base end side cleaning portion 40b may be adjusted by changing the type of elastomer or by changing the added amount and/or the type of the reinforcing material. For example, the reinforcing material may be added to the elastomer material used for molding the base end side cleaning portion 40b by a larger amount than the reinforcing material to be added to the elastomer material used for molding the top end side cleaning portion 40a to provide the base end side cleaning portion 40b with a higher hardness than the top end side cleaning portion 40a.

The top end side cleaning portion 40a and the base end side cleaning portion 40b may be different not only in hardness but also in hue. The hue of the top end side cleaning portion 40a and the base end side cleaning portion 40b may be determined from a view point of fine appearance of the interdental cleaning tool 1. For example, the top end side cleaning portion 40a may be molded with a pink molding material while the base end side cleaning portion 40b may be molded with a green molding material.

The top end side cleaning portion 40a includes a top end side body 42a covering the top end side portion of the shaft portion 20 (that is, a portion of the shaft portion 20 extending from the insertion end portion 22a by a length of approximately half the length of the covered section 22), and a plurality of top end side bristles 48a each having a shape of a thin projection protruding outward from the outer circumferential surface of the top end side body 42a. The top end side body 42a prevents a direct contact between the oral tissues and the hard shaft portion 20. Each of a plurality of top end side bristles 48a protruding outward from the outer circumferential surface of the top end side body 42a elastically deforms while the top end side portion of the shaft portion 20 is passing the interdental space and recovers the shape after the top end side portion has passed the interdental space. As a result, each of the top end side bristles 48a can scrape out the deposit from the oral tissues. The lengths of a plurality of top end side bristles 48a are set so that the top end side bristle 48a disposed further in the base end side has a larger protruding amount from the top end side body 42a.

The base end side cleaning portion 40b is disposed further in the base end side than the top end side body 42a from which a plurality of top end side bristles 48a protrude. The base end side cleaning portion 40b includes a base end side body 42b covering a portion of the outer circumferential surface of the shaft portion 20 further in the base end side than the top end side body 42a, and a plurality of base end side bristles 48b each having a shape of a thin projection protruding outward from the base end side body 42b. The base end side body 42b forms a covering layer (an elastomer layer or a composite material layer) which is continuous in the axial direction from a layer (an elastomer layer or a composite material layer) of the top end side body 42a, and prevents a direct contact between the oral tissues and the hard shaft portion 20 in the rest of the section of the covered section 22. Like the top end side bristles 48a described above, when the base end side body 42b is inserted in the interdental space, each of a plurality of base end side bristles 48b protruding outward from the base end side body 42b elastically deforms and recovers the shape to scrape out the deposit from the oral tissues. Like a plurality of top end side bristles 48a, the lengths of a plurality of base end side bristles 48b are set so that the base end side bristle 48b disposed further in the base end side has a larger protruding amount from the base end side body 42b. The base end side bristle 48b disposed at the most top end side is longer than the top end side bristle 48a disposed at the most base end side. Thus, the protruding amount of the whole brush portion including the base end side bristles 48b and the top end side bristles 48a decreases from the base end side to the top end side.

A plurality of base end side bristles 48b molded with a molding material having a hardness higher than a plurality of top end side bristles 48a as described above is less susceptible to elastic deformation than a plurality of top end side bristles 48a. Thus, each of a plurality of base end side bristles 48b contacts the oral tissues with a higher contact force than a plurality of top end side bristles 48a. As a result, a plurality of base end side bristles 48b can scrape out the deposit from the oral tissues more effectively than a plurality of top end side bristles 48a.

A plurality of top end side bristles 48a is less capable in scraping out the deposit than a plurality of base end side bristles 48b but contributes to easy insertion of the interdental cleaning tool 1 in the interdental space. The resilience caused when a plurality of top end side bristles 48a contacts the oral tissues and elastically deforms acts as a resistive force against the movement of the interdental cleaning tool 1 inserted in the interdental space. Since a plurality of top end side bristles 48a is molded with a molding material having a hardness lower than a plurality of base end side bristles 48b, the resilience caused by elastic deformation of a plurality of top end side bristles 48a is relatively small. That is, a user who wants to insert a portion having a plurality of top end side bristles 48a in an interdental space can insert the interdental cleaning tool 1 in the interdental space almost without feeling a resistive force acting on the interdental cleaning tool 1.

Since the molding material used for molding a plurality of top end side bristles 48a is different from the molding material used for molding a plurality of base end side bristles 48b not only in hardness but also in hue, the difference in physical properties described above (difference in hardness and difference in the resistive force resulting from the difference in hardness) between a plurality of top end side bristles 48a and a plurality of base end side bristles 48b can be visually recognized. That is, the difference in hue improves not only a fine appearance of the interdental cleaning tool 1 but also an appeal for excellent functions (that is, the function of allowing easy insertion and the function of effectively scraping out the deposit from oral tissues) of the interdental cleaning tool 1.

In the embodiment described above, the hue of the top end side body 42a and a plurality of top end side bristles 48a is different from the hue of the base end side body 42b and a plurality of base end side bristles 48b. However, these hues may be the same.

In the embodiment described above, the top end side body 42a and the base end side body 42b form the molding material layers which are axially continuous. However, the top end side body and the base end side body may be formed at an interval in the axial direction.

In the embodiment described above, the top end side body 42a and the base end side body 42b each cover a part of axially extending section of the shaft portion 20 (that is, the covered section 22). However, the top end side body and the base end side body may cover the entire length of the shaft portion.

In the embodiment described above, the length of the top end side body 42a in the axial direction is approximately the same as the length of the base end side body 42b in the axial direction. However, the lengths of the top end side body and the base end side body may be determined so that the length ratio in the axial direction of the top end side body to the base end side body takes a different value.

In the embodiment described above, the grip portion 30 continuing from the shaft portion 20 covered by the base end side body 42b and the top end side body 42a has a form of a thin plate. However, the grip portion may have a different form that can be held by the fingers of the user.

In the embodiment described above, the cleaning portion contributing to cleaning of the interdental space has two portions different in hardness (that is, the top end side cleaning portion 40a and the base end side cleaning portion 40b). However, the cleaning portion may have more than two portions that are different in hardness.

INDUSTRIAL APPLICABILITY

The structure of the embodiment described above can suitably be used in a field of oral health.

REFERENCE SIGNS 1 interdental cleaning tool
10 base portion
20 shaft portion
40a top end side cleaning portion
40b base end side cleaning portion
42a top end side body
42b base end side body
48a top end side bristle
48b base end side bristle

The invention claimed is:

1. An interdental cleaning tool comprising:
a base portion including a shaft portion having a shape insertable in an interdental space;
a top end side cleaning portion including a top end side body covering a top end side portion of the shaft portion, and a plurality of top end side bristles protruding outward from an outer circumferential surface of the top end side body; and
a base end side cleaning portion including a base end side body covering a portion of the shaft portion further in a base end side than the top end side body, and a plurality of base end side bristles protruding outward from an outer circumferential surface of the base end side body,
wherein the top end side bristles have lower hardness than the base end side bristles, and
wherein the top end side body has a lower hardness than the base end side body.

2. The interdental cleaning tool according to claim 1, wherein the top end side cleaning portion has a hue different from a hue of the base end side cleaning portion.

3. The interdental cleaning tool according to claim 2, wherein the base end side cleaning portion is made of a composite material including elastomer and a reinforcing material.

4. The interdental cleaning tool according to claim 1, wherein the base end side cleaning portion is made of a composite material including elastomer and a reinforcing material.

* * * * *